(12) United States Patent
Johnston, III

(10) Patent No.: US 8,196,969 B2
(45) Date of Patent: Jun. 12, 2012

(54) PRE-MACHINED WINDOW WELD FOR BREACHED TUBING

(76) Inventor: John Graham Johnston, III, Minneapolis, MN (US)

(*) Notice: Subject to any disclaimer, the term of this patent is extended or adjusted under 35 U.S.C. 154(b) by 435 days.

(21) Appl. No.: 12/542,774

(22) Filed: Aug. 18, 2009

(65) Prior Publication Data

US 2010/0140919 A1   Jun. 10, 2010

Related U.S. Application Data

(60) Provisional application No. 61/120,875, filed on Dec. 9, 2008.

(51) Int. Cl.
*F16L 13/02* (2006.01)
(52) U.S. Cl. .................... 285/288.1; 285/15
(58) Field of Classification Search ............. 285/15, 285/288.1, 288.2, 288.7, 288.9
See application file for complete search history.

(56) References Cited

U.S. PATENT DOCUMENTS

| | | | | |
|---|---|---|---|---|
| 2,156,395 A * | 5/1939 | Klouman | ............. | 285/288.2 |
| 2,479,578 A * | 8/1949 | Langvand | ............. | 285/288.1 |
| 3,254,909 A * | 6/1966 | Ver Nooy | ............. | 285/288.1 |
| 4,244,606 A * | 1/1981 | Abrahamson | ............. | 285/288.1 |
| 4,438,955 A * | 3/1984 | Ryan | ............. | 285/288.1 |
| 4,640,532 A * | 2/1987 | Pope | ............. | 285/288.1 |
| 5,086,854 A * | 2/1992 | Roussy | ............. | 285/288.2 |
| 7,165,579 B2 * | 1/2007 | Borland et al. | ............. | 285/15 |
| 7,722,088 B2 * | 5/2010 | Pionetti | ............. | 285/288.1 |
| 7,741,580 B2 * | 6/2010 | Holdren | ............. | 285/288.1 |
| 7,793,992 B2 * | 9/2010 | Pionnetti | ............. | 285/288.1 |

* cited by examiner

*Primary Examiner* — David E Bochna
(74) *Attorney, Agent, or Firm* — Merchant & Gould P.C.

(57) ABSTRACT

An example apparatus for replacement of a breached pipe section includes a first cylindrical pipe fitting having a first surface defining a first aperture, a middle pipe member, and a second cylindrical pipe fitting having a second surface defining a second aperture, and first and second aperture caps. A first end of each of the first and second pipe fittings is welded to opposite ends of the middle section, and a second end opposite of each of the first and second pipe fittings is welded through the respective first and second apertures to opposite ends of pipe surrounding the breached pipe section. The first and second aperture caps are welded to the apertures of the first and second pipe fittings to close the respective first and second apertures.

11 Claims, 17 Drawing Sheets

PRE-MACHINED WINDOW WELD FOR BREACHED TUBING

RELATED APPLICATIONS

This application claims the benefit of U.S. Patent Application Ser. No. 61/120,875 filed on Dec. 9, 2008, the entirety of which is hereby incorporated by reference.

BACKGROUND

An electric utility regularly uses steam turbines driven by steam produced in boilers to generate electricity for customers. In general, a network of pipework is required to direct steam and steam condensate to and from various elements in the system. Pipework is required to transfer the steam from the boiler to the steam turbine. The boiler itself can be massive, measuring up to a hundred feet on a side and many stories in height for a typical boiler installation. Thousands of pipes can be routed through the boiler to various locations. For example, pipework is required to transfer steam condensate back to the boiler. Other sections of pipework are required as well.

The network of pipework utilized in boiler/steam turbine system is subjected to a range of operating conditions that render the pipework susceptible to breach. For example, large sections of pipework are subjected to elevated pressures and temperatures. Additionally, feed water impurities such as caustic compounds and dissolved gases and matter can be detrimental to pipework integrity over time. In the event of a breach, the damaged pipe section must be replaced.

One concern relating to the replacement of breached portions of pipework is the extent of boiler downtime that may be as required to repair a damaged pipe section. In general, due to the interconnectivity of the respective elements of the system, the boiler must be disabled to replace the damaged section. In critical applications such as electricity generation, the length of time the boiler is disabled is directly proportional to losses incurred. Consequently, it is desirable to minimize boiler downtime.

SUMMARY

In one example, an apparatus for replacing a breached section of pipe includes a first pipe fitting having a first end, a second end, and a first surface defining a first aperture at the second end of the first pipe fitting, a middle pipe member, and a second pipe fitting having a first end, a second end, and a second surface defining a second aperture at the second end of the second pipe fitting. The apparatus also includes first and second aperture caps. The first end of each of the first and second pipe fittings is welded to opposite ends of the middle pipe member, and the second end of each of the first and second pipe fittings is welded through the respective first and second apertures to opposite ends of pipe surrounding the breached pipe section. The first and second aperture caps are welded to respective ones of the first and second apertures of the first and second pipe fittings to close the respective first and second apertures.

The various embodiments described above are provided by way of illustration only and should not be construed to limiting. Various modifications and changes that may be made to the embodiments described above without departing from the true spirit and scope of the disclosure.

DESCRIPTION OF THE DRAWINGS

Aspects of the disclosure may be more completely understood in consideration of the following detailed description of various embodiments of the disclosure in connection with the accompanying drawings, in which.

DETAILED DESCRIPTION

The example embodiments described in the following disclosure are provided by way of illustration only and should not be construed as limiting. Various modifications and changes may be made to the example embodiments described below without departing from the true spirit and scope of the disclosure.

The present disclosure relates generally to apparatuses and methods to facilitate replacement of a breached section of pipe in a system having a network of pipework.

In the example embodiments provided herein, the described techniques relate to pipework associated with electricity generation applications. However, it will be appreciated that the apparatus and methods according to the principles of the present disclosure are applicable to any system having pipework, ranging from large-scale applications such as manufacturing, heating and electricity generation to small-scale applications such as pipework for pumps, compressors and other shaft driven equipment. Further, it will be appreciated that a section of pipe as referred to in the present application can be of any type of pipe or tubing. For example, a pipe section can be a straight pipe section, an elbow pipe section, a straight pipe section with a reducer section, a branch pipe section, and other types of pipe sections.

Figure 1:
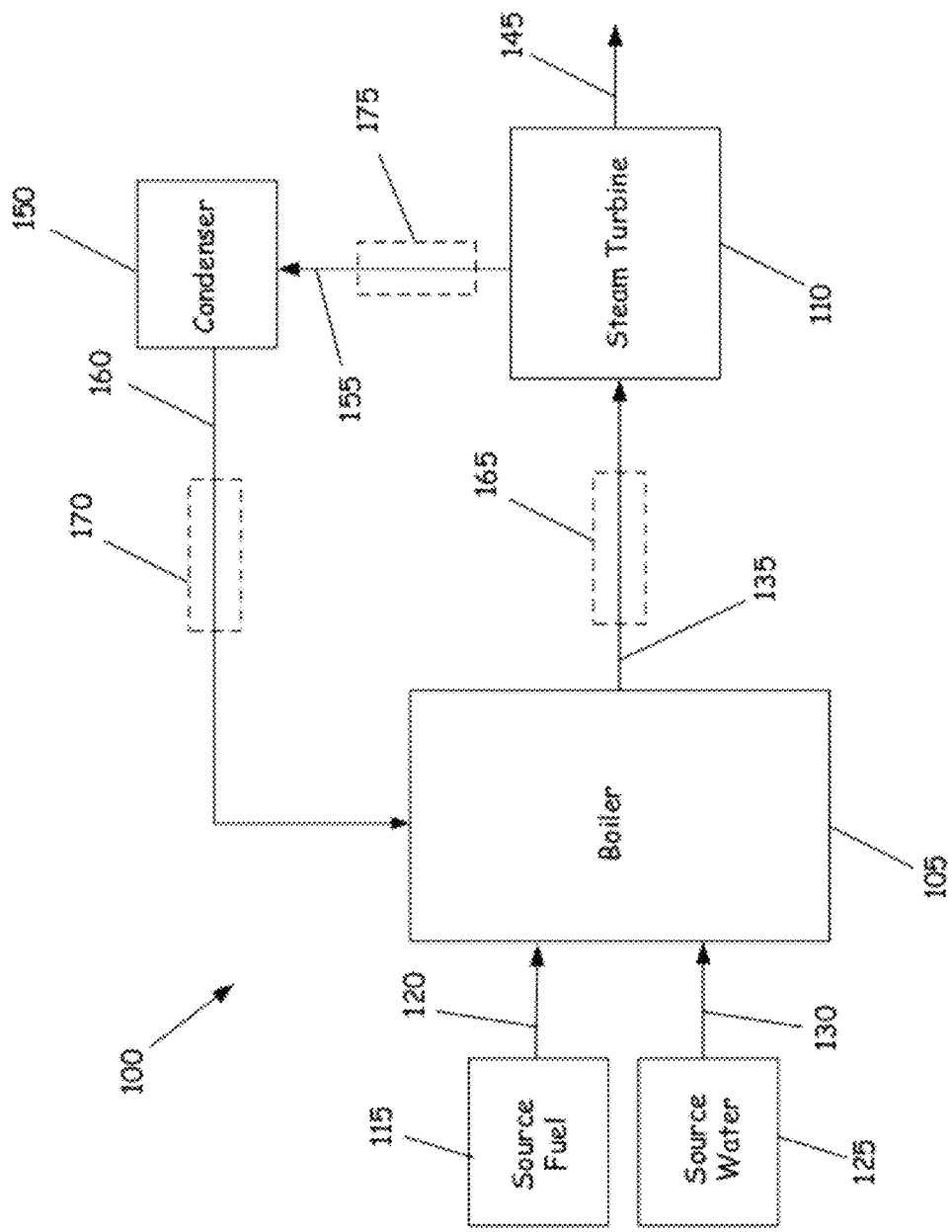
FIG. 1 shows an example system having a network of pipework.

Referring to FIG. 1, an example system 100 is shown depicting a simplified pipework network for an electricity generation application. In the example embodiment, system 100 includes a boiler 105 to provide steam to a steam turbine 110 for the generation of electricity. In operation, water is transferred to the boiler 105 from water source 125 via water source line 130. Additionally, source fuel 115 is provided to boiler 105 via source fuel feed line 120. In this manner, source fuel 115 is utilized to vaporize the source water 125 into steam in the boiler 105. The steam is conditioned in the boiler 105 to a superheated, high-pressure state and transferred to steam turbine 110 via mains pipework 135. Steam passing through steam turbine 110 translates to rotational mechanical energy for the generation of electricity, which in turn is transferred via mains electrical line 145 for distribution. The steam is then transferred from steam turbine 110 to a condenser 150 via transfer pipework 155 to recover and return water to the boiler 105 via condensate pipework 160. Other configurations are possible.

In general, mains pipework 135, transfer pipework 155, and condensate pipework 160 are supplemented by a network of supporting pipework subjected to similar high temperature and high pressure operating conditions. These, and other, operating conditions can compromise the structural integrity of any given portion of the pipework in the entire network such that a breach can occur. For example, a mains section 165 of mains pipework 135, or a transfer section 175 of transfer pipework 155, or a condensate section 170 of condensate pipework 160 can potentially contain a breach. It will be appreciated by those skilled in the art that each respective section of pipework in the network is subjected to varying operating conditions such that the mechanism responsible for the breach may be different. For example, mains pipework 135 is primarily subjected to superheated, highly pressurized steam, and as such, temperature and pressure may be responsible for a compromise in the structural integrity of the mains section 165. In contrast, condensate pipework 160 is subjected to water in both the liquid and vapor phase. In this manner, a breach may occur in a first portion of condensate section 170 as a result of corrosive compounds and/or a transverse frictional force developed by moving water in the liquid-state. In contrast, a second portion of condensate section 170 may be primarily subjected to low temperature, vapor-phase water, and may not be as susceptible to damage as the first portion.

Figure 2:
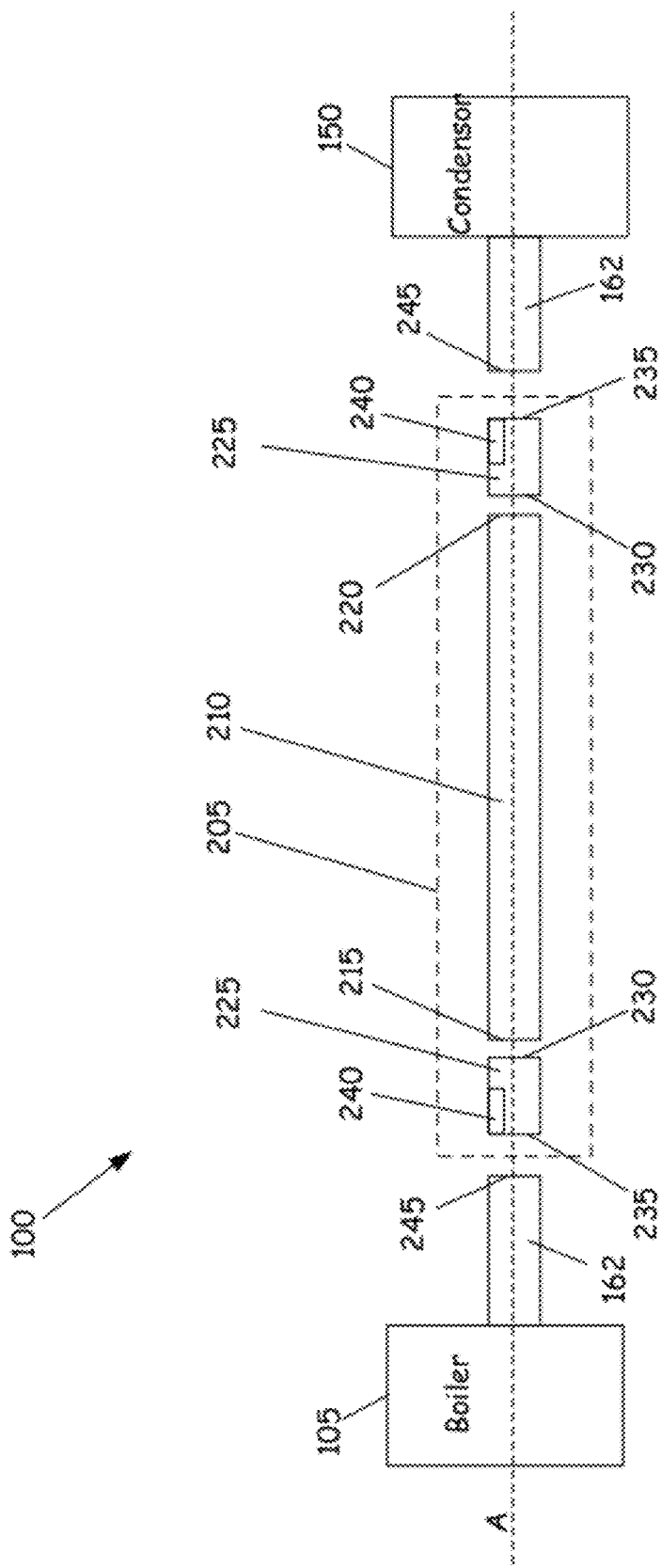
FIG. 2 shows a first example replacement pipe section to replace a section of breached pipe in the pipework of the system of FIG. 1.

Referring now to FIG. 2, a portion of the system 100 of FIG. 1 is shown. A length of condensate section 170 of condensate pipework 160 is shown as being removed as part of a repair of a breach in this section. A replacement section 205 is shown as positioned in place of condensate section 170 as a replacement pipe section. Typically, depending on the extent of the breach, a nominal length of pipe is removed on either side of the breached section via grinding, sawing, flame cutting, plasma cutting, or other method, to guarantee the structural integrity of remaining portions 162 of condensate pipework 160. In certain embodiments, the length of removed pipe is the length of the breach plus twice the outer diameter of the pipe.

In the described embodiment, the boiler 105 must be disabled such that the damaged condensate section 170 can be replaced with replacement section 205, due to the interconnectivity of the respective elements of the system 100. As such, according to principles of the present disclosure, the replacement section 205 includes a plurality of pre-machined components. In this manner, the replacement section 205 is retrofitted to the remaining portions 162 of condensate pipework 160 such that in situ manual joint preparation is avoided, substantially decreasing the amount of downtime of the boiler 105, and thereby minimizing financial losses incurred.

In one embodiment, replacement section 205 is a multi-piece kit including a central pipe section 210 and a pair of end fittings 225, each respective end fitting 225 having a window section 240. In the described embodiment, end fittings 225 and window section 240 are pre-machined.

Central pipe section 210 includes a first end 215 and a second end 220. In certain embodiments, each of the respective ends 215, 220 includes a beveled surface around a circumference of the central pipe section 210. Each respective end fitting 225 includes a proximal end 230, and a distal end 235. In certain embodiments, the proximal end 230 of each respective end fitting 225 includes a beveled surface around a circumference of the end fitting 225. Each respective remaining portion 162 of condensate pipework 160 has a remaining end 245.

In the example embodiment, each remaining portion 162, central pipe section 210, and end fittings 225 are axially symmetric and are positioned and orientated to be in axial alignment with respect to a longitudinal axis A. In this manner, replacement section 205 can be retrofitted to the remaining portions 162 to replace damaged condensate section 170.

In the described embodiment, central pipe section 210 is positioned between the pair of end fittings 225 such that the proximal end 230 of a respective end fitting 225 is orientated towards and positioned in contact to a respective end 215, 220 of central pipe section 210. In this manner, a V-shaped groove is formed as beveled surface of respective end 215, 220 of central pipe section 210 and beveled surface of the proximal end 230 of each respective end fitting 225 form an acute angle when positioned together, described in further detail below. Further, the distal end 235 of each respective end fitting 225 is orientated towards and positioned in contact to the remaining end 245 of a respective remaining portion 162. Subsequently, the distal end 235 of each respective end fitting 225 can be welded to corresponding remaining end 245, and the proximal end 230 of each respective end fitting 225 can be welded to a corresponding end 215, 220 of central pipe section 210 to form a continuous passage for condensate to transfer from the condenser 150 to the boiler 105.

Figure 3:
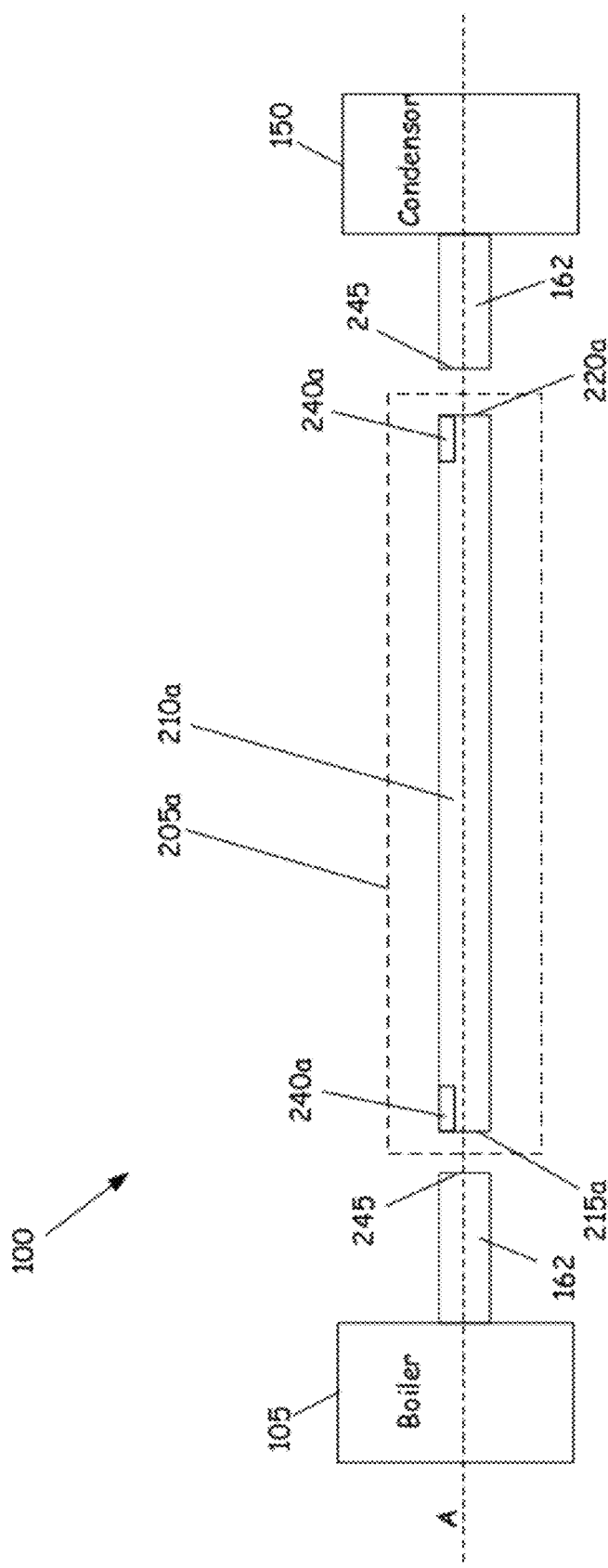
FIG. 3 shows a second example replacement pipe section to replace a section of breached pipe in the pipework of the system of FIG. 1.

Referring now to FIG. 3, a replacement section 205a is shown as an alternate embodiment of a replacement pipe section. In many aspects, the replacement section 205a of FIG. 3 is similar to the replacement section 205 of FIG. 2. Replacement section 205a is an example pipe section in which the central pipe section 210 and respective end fittings 225 of replacement section 205 are formed as a single pipe or tubing section. Replacement section 205a can be advantageous in situations in which a short pipe section is required to repair a breached pipe section.

In the example embodiment, the components of replacement section 205a are pre-machined such that the replacement section 205a can be retrofitted to the remaining portions 162 of condensate pipework 160, thereby avoiding in situ manual joint preparation, as described above. The replacement section 205a includes a central pipe section 210a, having a first end 215a and a second end 220a, and a plurality of window sections 240a.

In the example embodiment, the central pipe section 210a and each of the remaining portions 162 are axially symmetric and are orientated to be in axial alignment with respect to the longitudinal axis, A. Subsequently, the first end 215a and the second end 220a can be positioned in contact to the remaining end 245 of a respective remaining portion 162. In this manner, the first end 215a and the second end 220a can be welded to corresponding remaining end 245 to form a continuous passage for condensate to transfer from the condenser 150 to the boiler 105.

Figure 4:
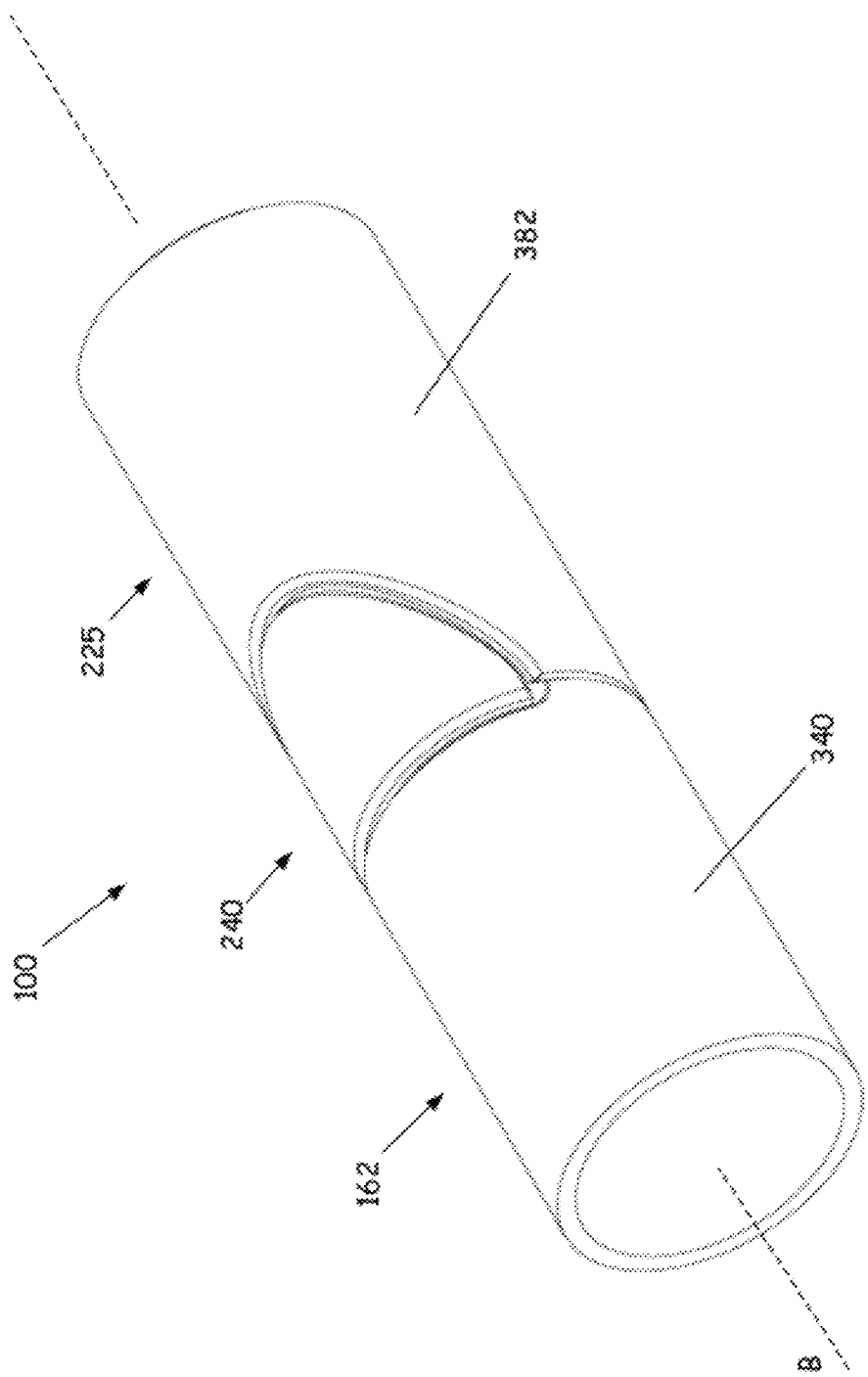
FIG. 4 is an enlarged view of a portion of replacement pipe section of FIG. 2.
Figure 5:
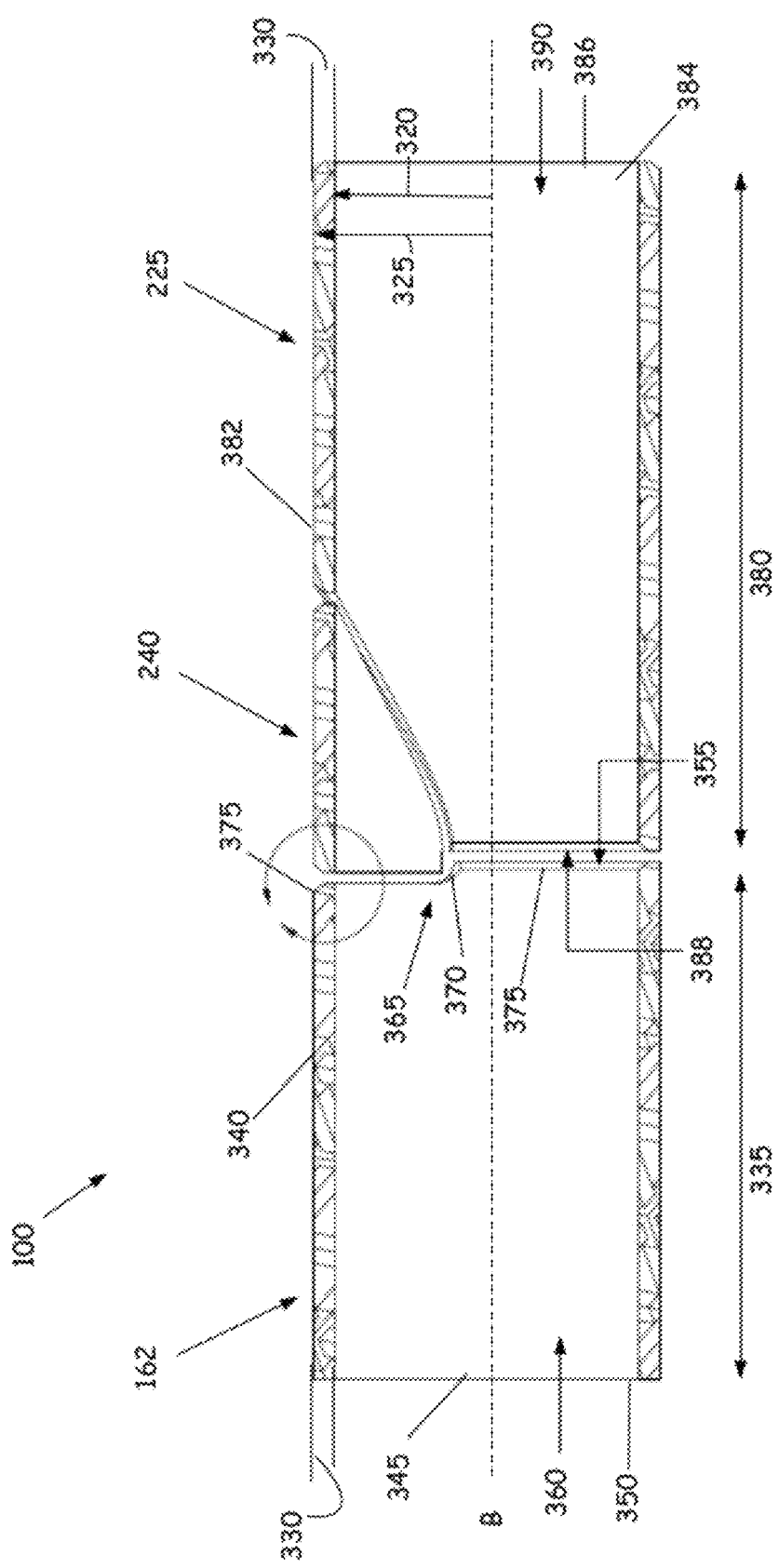
FIG. 5 is cross-sectional view of the replacement pipe section of FIG. 4.

Referring now to FIGS. 4 and 5, a portion of the system 100 in FIG. 2 is shown depicting the a pre-machined end fitting 225, a pre-machined window section 240, and a remaining portion 162 positioned in close proximity. In the example embodiment, end fitting 225 and remaining portion 162 are cylindrical and include an equivalent inner and outer radius 320, 325 as measured with respect to a longitudinal axis, B. A wall thickness 330 is defined as the difference between outer radius 325 and inner radius 320.

Figure 6:
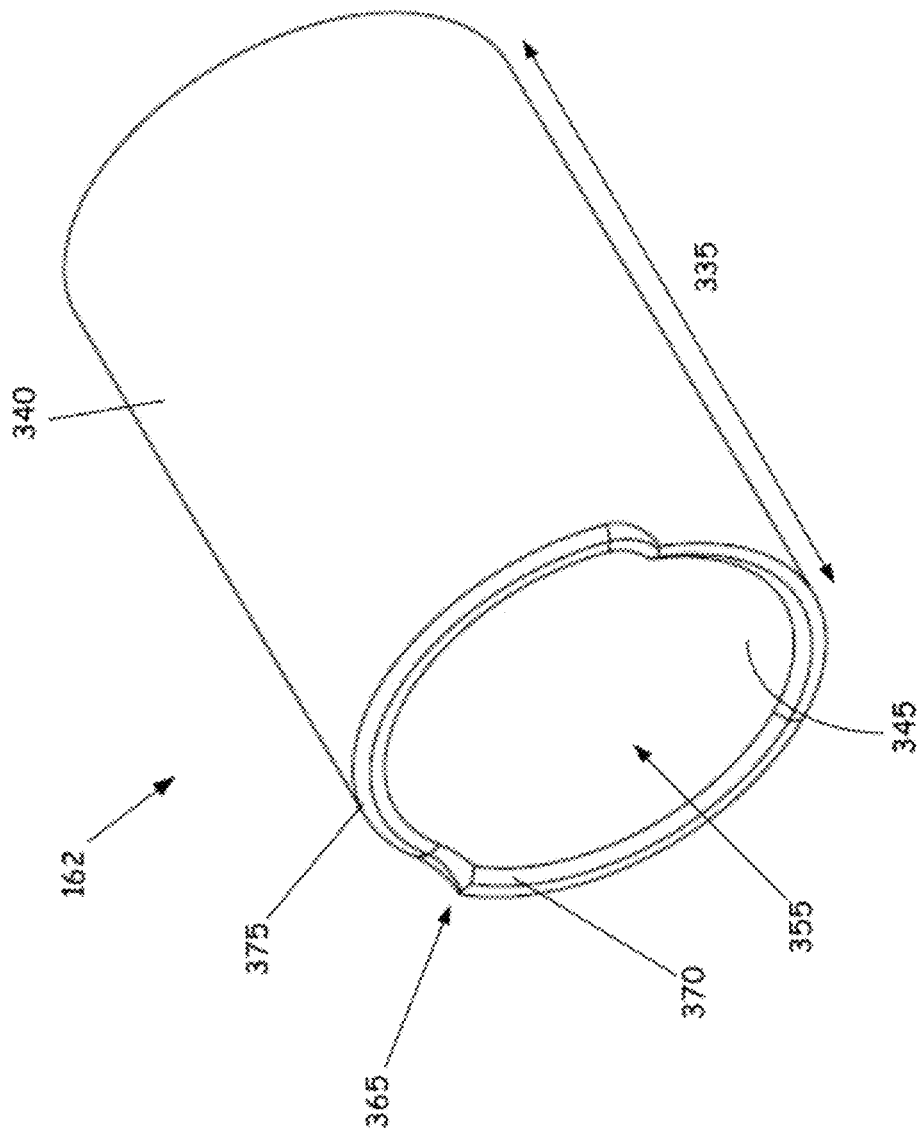
FIG. 6 is perspective view of a remaining portion of pipework as shown in FIGS. 2 and 3.
Figure 7:
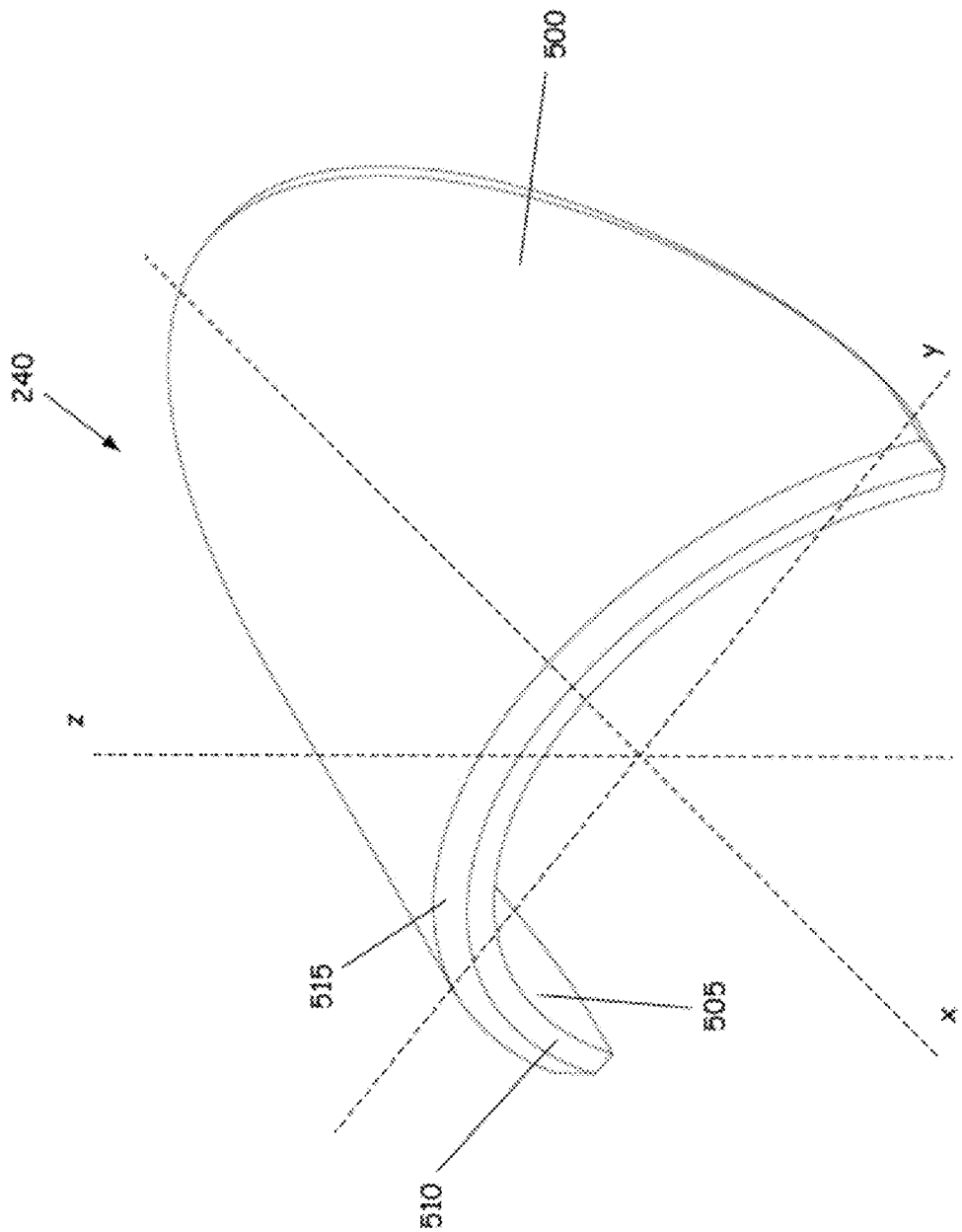
FIG. 7 is a perspective view of a window section.

Referring now to FIGS. 5 and 6, remaining portion 162 has a first length 335 and includes a first external surface 340 and a first internal surface 345. The first internal surface 345 is defined by a first proximal opening 350 and a first distal opening 355 that is opposite of the first proximal opening 350 such that a first passage 360 is formed. Adjacent to first distal opening 355 is a curved aperture 365. Additionally, remaining portion 162 includes a primary facet 370 and a secondary facet 375. In general, primary facet 370 and secondary facet 375 are adjacent and extend along a perimeter of the first distal opening 355 and curved aperture 365. In the example embodiment, the primary facet 370 and secondary facet 375 are formed by an installer once condensate section 170 of condensate pipework 160 is removed. The primary facet 370 is formed such that a complementary surface of the window section 240 and a complementary surface of the end fitting 225 are engaged when the window section 240, the end fitting 225 and the remaining portion 162 are positioned together, as described in further detail below. Additionally, secondary facet 375 is angled with respect to the primary facet 370. In this manner, a V-shaped channel is formed when the window section 240, the end fitting 225 and the remaining portion 162 are positioned together.

Referring now to FIGS. 7-10, window section 240 is shown according to one embodiment of the present disclosure. In the example shown, window section 240 is generally a 3-dimensional fingernail shaped member defined with respect to an orthogonal x-y-z coordinate axis. Window section 240 includes a top surface 500, a bottom surface 505, a first facet 510, and a second facet 515. In the example embodiment, first facet 510 is a surface that is adjacent to the bottom surface 505 and the second facet 515. Further, second facet 515 is a surface that is adjacent to the top surface 500 and first facet 510.

As projected in a y-z plane of the x-y-z coordinate axis, the form of the window section 240 is characterized by an arc angle, C and an arc length, D, see FIG. 6. In this manner, a radius of curvature, E, is defined by the well know relation stating that arc length (D) is proportional to the product of a radius of curvature (E) and an arc angle (C, in radians). Accordingly, it will be appreciated that the form of window section 240 in the y-z plane is customizable. In the example embodiment, the radius of curvature, E is fixed by a radius of curvature of the end fitting 225 and the remaining portion 162 (defined via inner radius 320, FIG. 5). As such, a designer can manipulate the arc length, D and the arc angle, C as a fixed ratio to customize the window section 240. In general, a customizable window section 240 is desirable such that access provided by window section 240 to a seam formed by a remaining portion 162 and end fitting 225 interface when positioned together is maximized to perform welding. As previously mentioned, window section 240 is preferably a pre-machined structure.

Figure 9:
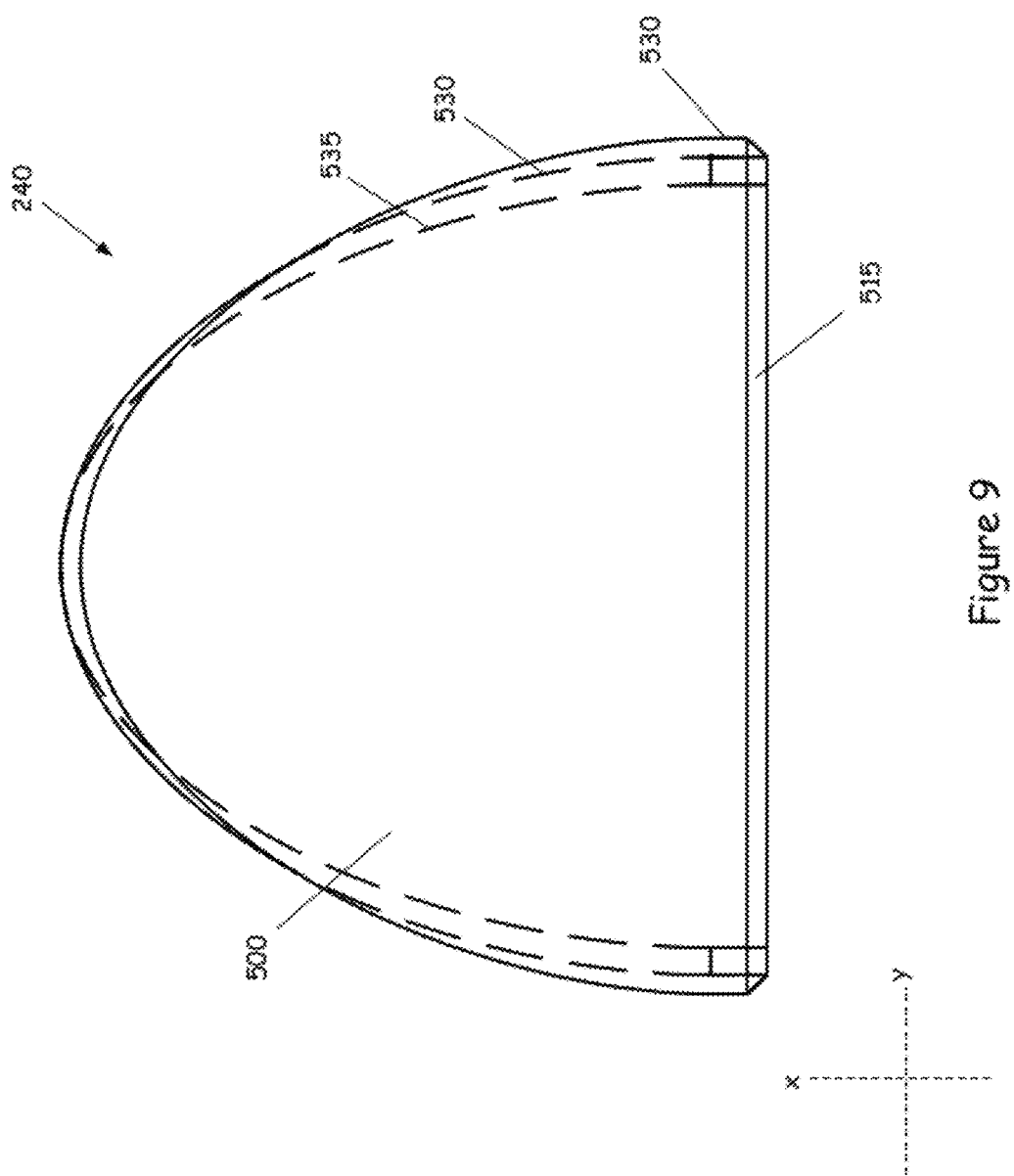
FIG. 9 is a top view of the window section of FIG. 7.

Referring now to FIG. 9, the shape of the window section 240 as projected in a x-y plane of the x-y-z coordinate axis is characterized by a first periphery 525, a second periphery 530, and a third periphery 535. In the example embodiment, the first periphery 525 is an edge defined by the interface between the top surface 500 and the second facet 515, the second periphery 530 is an edge defined by the interface between the second facet 515 and the first facet 510, and the third periphery 535 is an edge defined by the interface between the first facet 510 and the bottom surface 505. In the example embodiment, the first, second and third peripheries 525, 530, 535 are elliptically shaped as projected in the x-y plane. Other shapes are possible as well. In the described embodiment, the respective peripheries 525, 530, 535 can be described by a polynomial having the form of $ax^2+bxy+cy^2+dx+ey+f=0$, where $x>0$ and a, b, c, d, e and f are coefficients. In this manner, it will be appreciated that the shape of the window section 240 is customizable by varying the coefficients of the polynomial.

Figure 8:
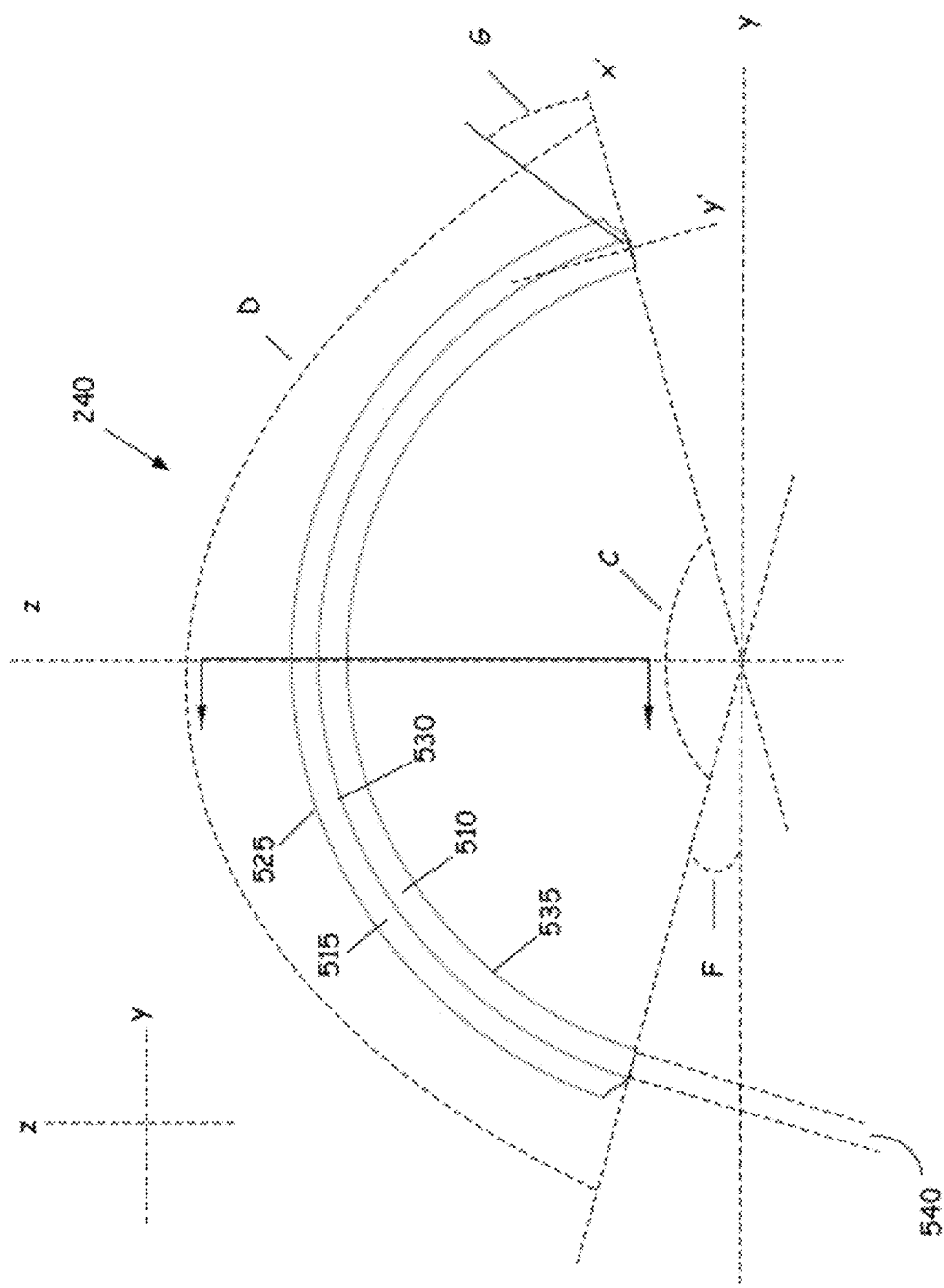
FIG. 8 is a front view of the window section of FIG. 7.
Figure 10:
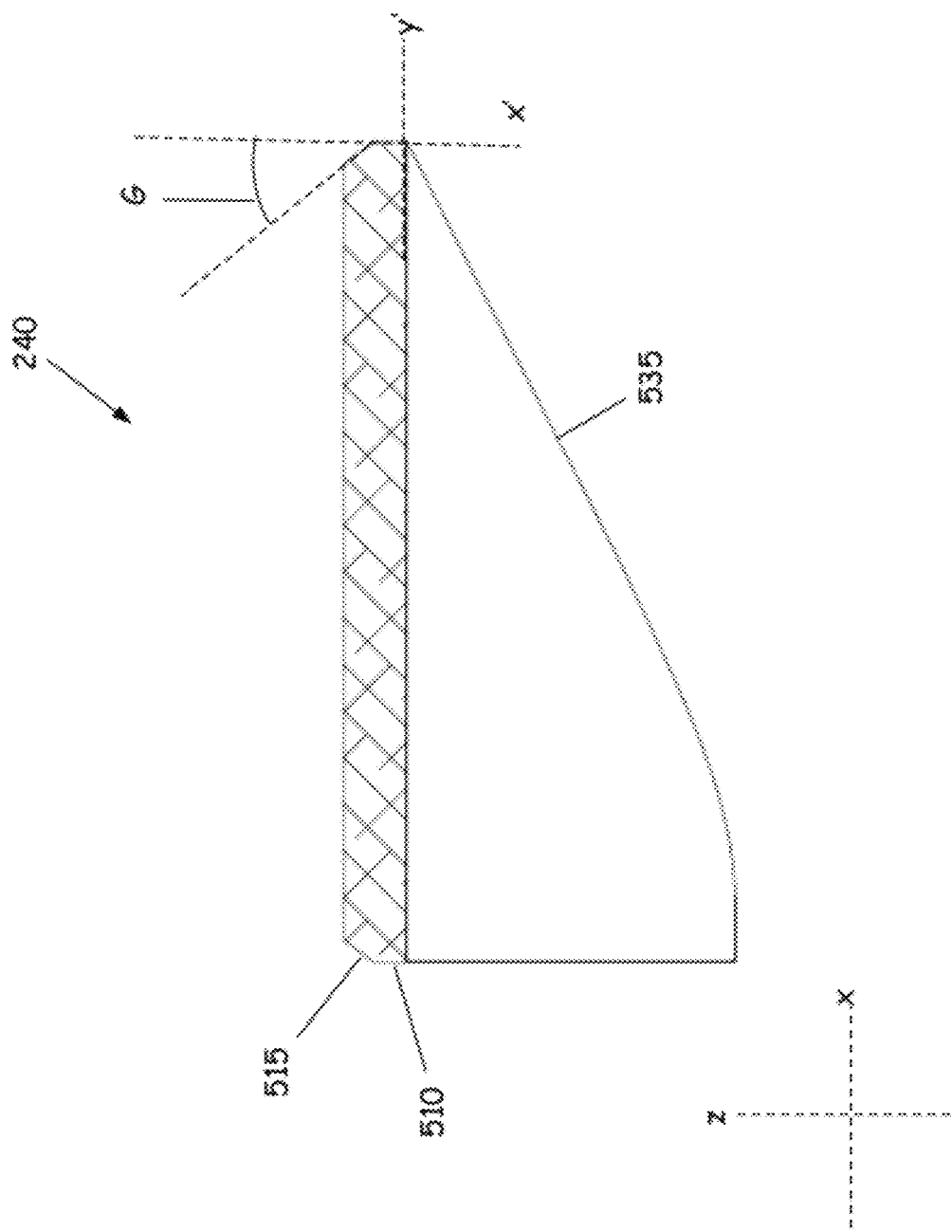
FIG. 10 is a cross-sectional view of the window section of FIG. 7.
Figure 11:
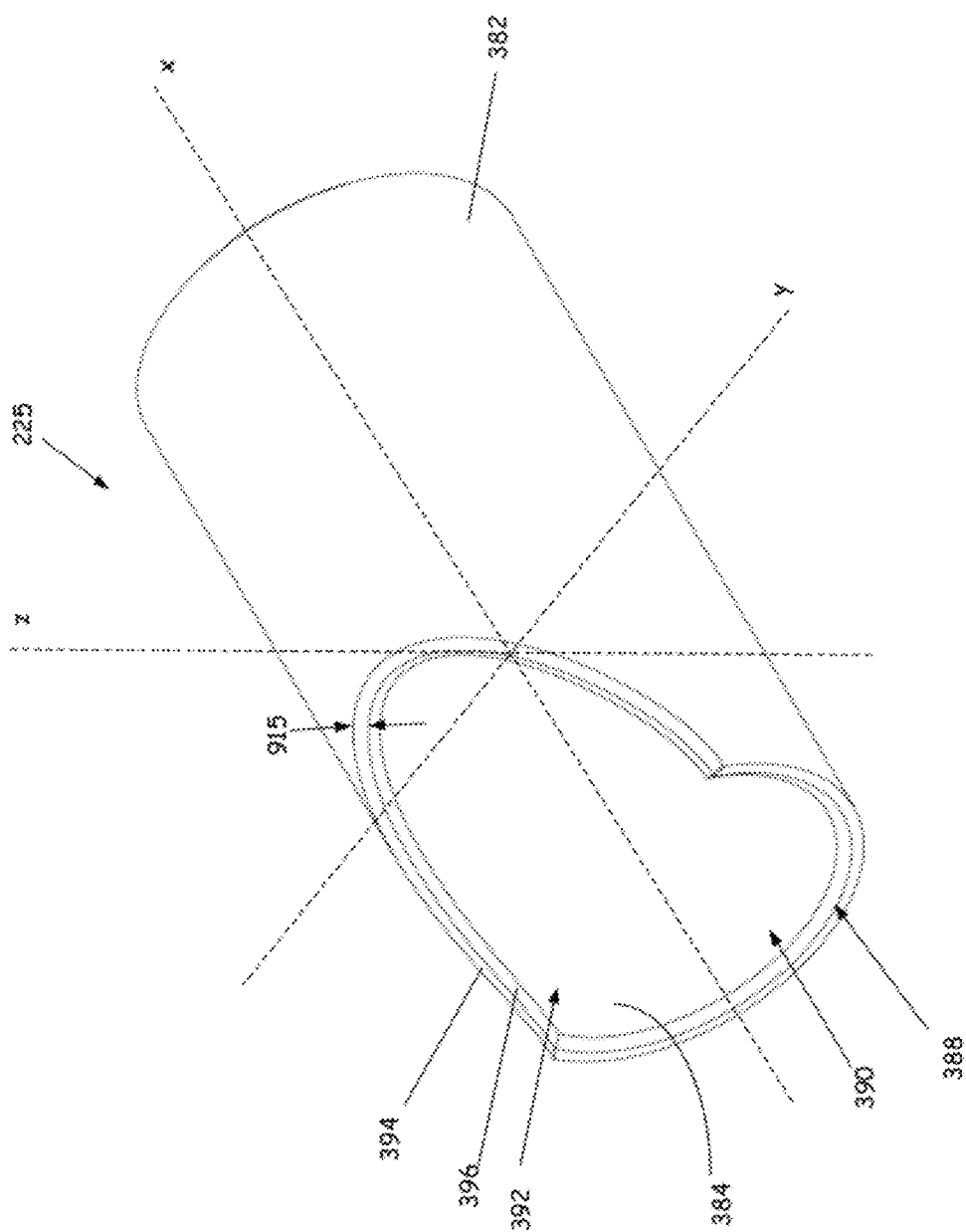
FIG. 11 is a perspective view of an end fitting.

As described above, the first facet 510 is a surface defined adjacent to bottom surface 505 and second facet 515. In the example embodiment, the first facet 510 has a first facet width 540. The portion of the first facet 510 exclusively visible in the y-z plane, as shown in FIG. 6, is entirely contained in the y-z plane, in other words the described portion of the first facet 510 is formed perpendicular to an x-y plane of the defined x-y-z coordinate axis. Along the remaining extent of the window section 240, the first facet 510 is formed at an angle F, as measured with respect to the x-y-z coordinate axis, FIG. 8. Further, as described above, second facet 515 is a surface defined adjacent to first facet 510 and top surface 500. In the example embodiment, the second facet 515 has a second facet width 545 and is formed at an angle G with respect to an orthogonal x'-y' coordinate axis having a primary coordinate, x', coincident with the surface of the first facet 510, as shown in FIG. 8 and FIG. 10. In the example embodiment, this relationship is maintained along the entire length of second facet 515. In the described embodiment, the angle G is fixed along the length of the first and second facets 510, 515 at an angle of 37.5 degrees. Other angular values for the angle G are possible as well. The shape of the window section 240 can be further characterized as projected in an x-z plane, as shown in FIG. 10.

Referring now to FIG. 4 and FIGS. 11-14, end fitting 225 is shown according to one embodiment of the present disclosure. As described above, end fitting 225 has a wall thickness 330 defined as the difference between outer radius 325 and inner radius 320. Further, end fitting has a length 380, a second external surface 382, and a second internal surface 384. The second internal surface 384 is defined by a second proximal opening 386 and a second distal opening 388 such that a second passage 390 is formed. Adjacent to second distal opening 388 is a window aperture 392. Additionally, end fitting 225 includes a second window facet 394 and a first window facet 396. In the example embodiment, second window facet 394 is a surface that is adjacent to second external surface 382 and first window facet 396. Further, a first window facet 396 is a surface that is adjacent to second internal surface 384 and second window facet 394. In general, respective facets 394, 396 extend along a perimeter of the second distal opening 388 and the window aperture 392.

Figure 12:
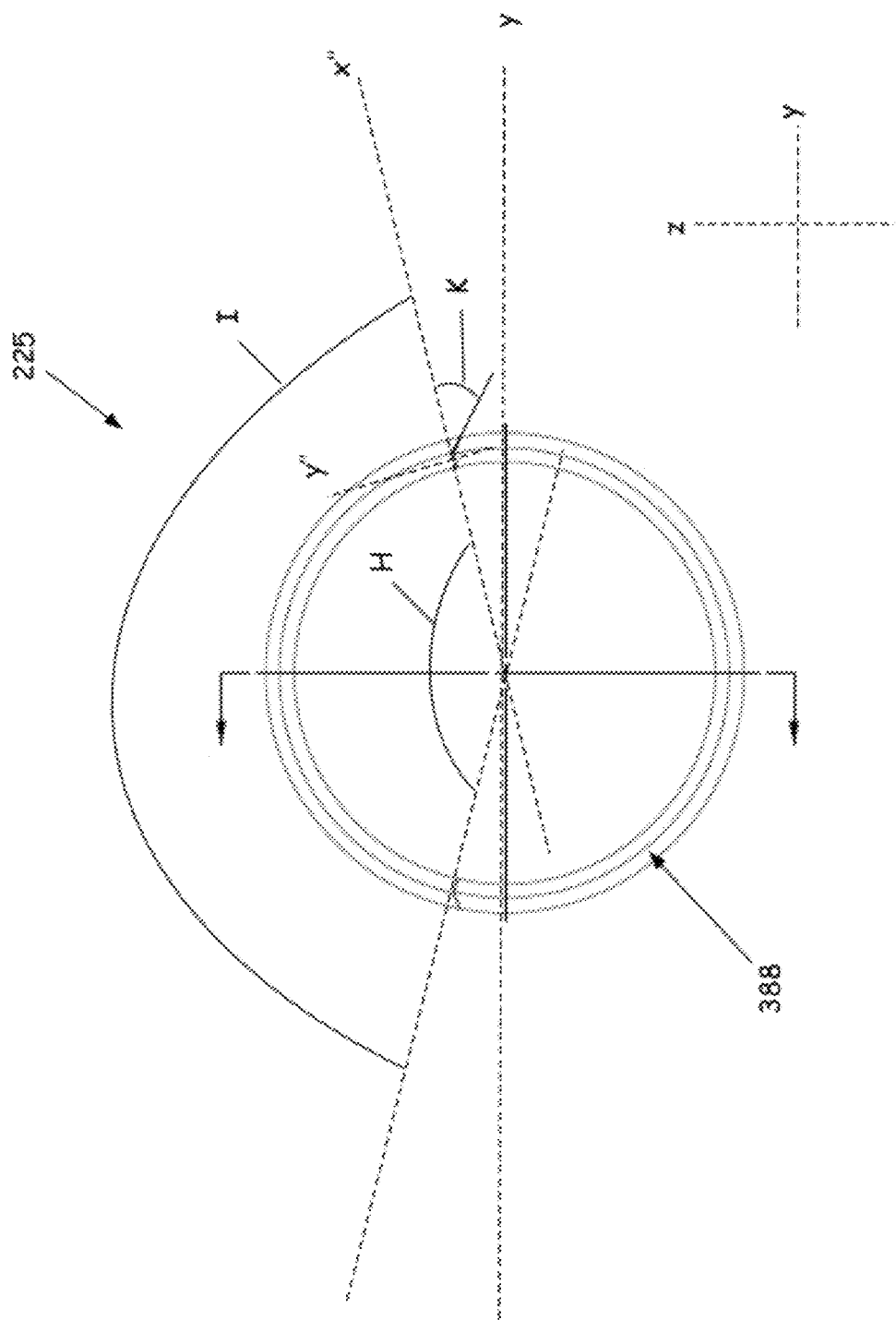
FIG. 12 is a front view of the end fitting of FIG. 11.

Referring now to FIG. 12, the shape of the second distal opening 388 of the end fitting 225 as projected in a y-z plane of an x-y-z coordinate axis is characterized in a similar manner as the respective surfaces 500, 505 of window section 240. For example, the form of second distal opening 388 can be characterized by an arc angle, H and an arc length, I. In this manner, a radius of curvature, J, is defined by the well know relation stating that arc length (I) is proportional to the product of a radius of curvature (J) and an arc angle (H, in radians). In this manner, it will be appreciated that the form of the second distal opening 388 of the end fitting 225 in the y-z plane is customizable, as described above. In the example embodiment, the described customization is preferably performed in tandem with window section 240 customization, as described above.

Figure 13:
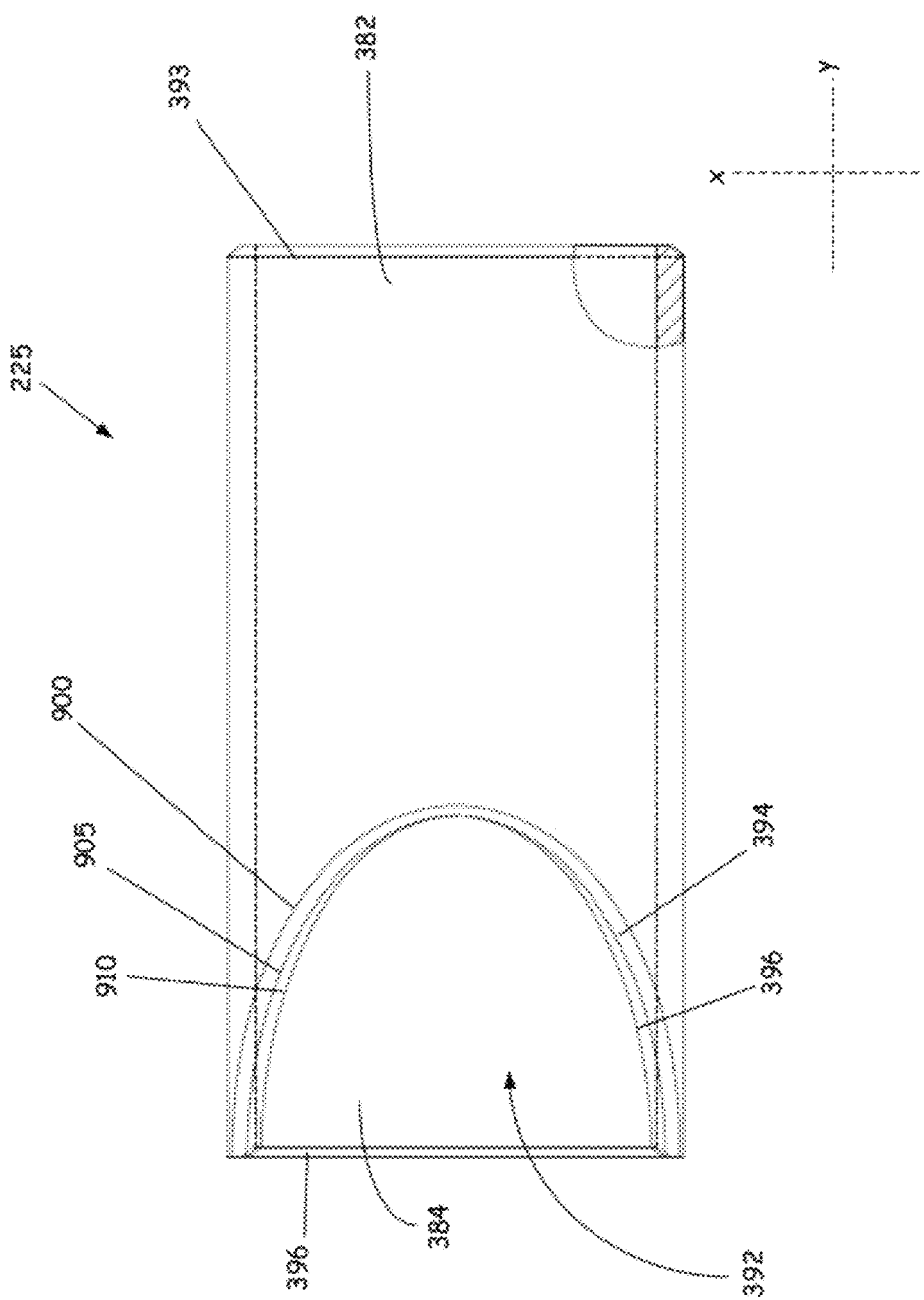
FIG. 13 is a top view of the end fitting of FIG. 11.

The end fitting 225 as projected in an x-y plane of the x-y-z coordinate axis is shown in FIG. 13. The form of the window aperture 392 of the end fitting 225 is characterized by a first window periphery 900, a second window periphery 905, and a third window periphery 910. In the example embodiment, the first window periphery 900 is an edge defined by an interface between the second external surface 382 and the second window facet 394, the second window periphery 905 is an edge defined by an interface between the first window facet 396 and the second window facet 394, and the third window periphery 910 is an edge defined by an interface between the first window facet 396 and the second internal surface 384.

In the example embodiment, the first, second and third peripheries 900, 905, 910 are elliptically shaped as projected in the x-y plane. Other shapes are possible as well. In the described embodiment, the respective peripheries 900, 905, 910 can be described by a polynomial having the form of $ax^2+bxy+cy^2+dx+ey+f=0$, where $x>0$ and a, b, c, d, e and f are coefficients, and wherein the x-y coordinate axis is orientated accordingly. In this manner, it will be appreciated that the shape of the window aperture 392 is customizable by varying the coefficients of the polynomial. In the preferred embodiment, the set of ellipses described by respective peripheries 900, 905, 910 of the end fitting 225 are complementary to the set of ellipses described by the respective peripheries 525, 530, 535 of the window section 240.

As described above, second window facet 394 is a surface defined adjacent to second external surface 382 and first window facet 396. In the example embodiment, the second window facet 394 has a second window facet width 915. The portion of the second window facet 394 positioned on the perimeter of the second distal opening 388 is entirely contained in the y-z plane, see FIG. 12, in other words the described portion of the second window facet 394 is formed perpendicular to the x-y plane of the x-y-z coordinate axis as defined. The portion of the second window facet 394 positioned on the perimeter of the widow aperture 290 is formed at an angle K, as measured with respect to an orthogonal x"-y" coordinate axis having a primary coordinate x" coincident with first window facet 396. In the example embodiment, this relationship is maintained along the entire length of second window facet 394. In the described embodiment, the angle K is fixed along the length of the first and second window facet 396, 394 at an angle of 37.5 degrees. Other angular values for the angle K are possible as well.

Figure 14:
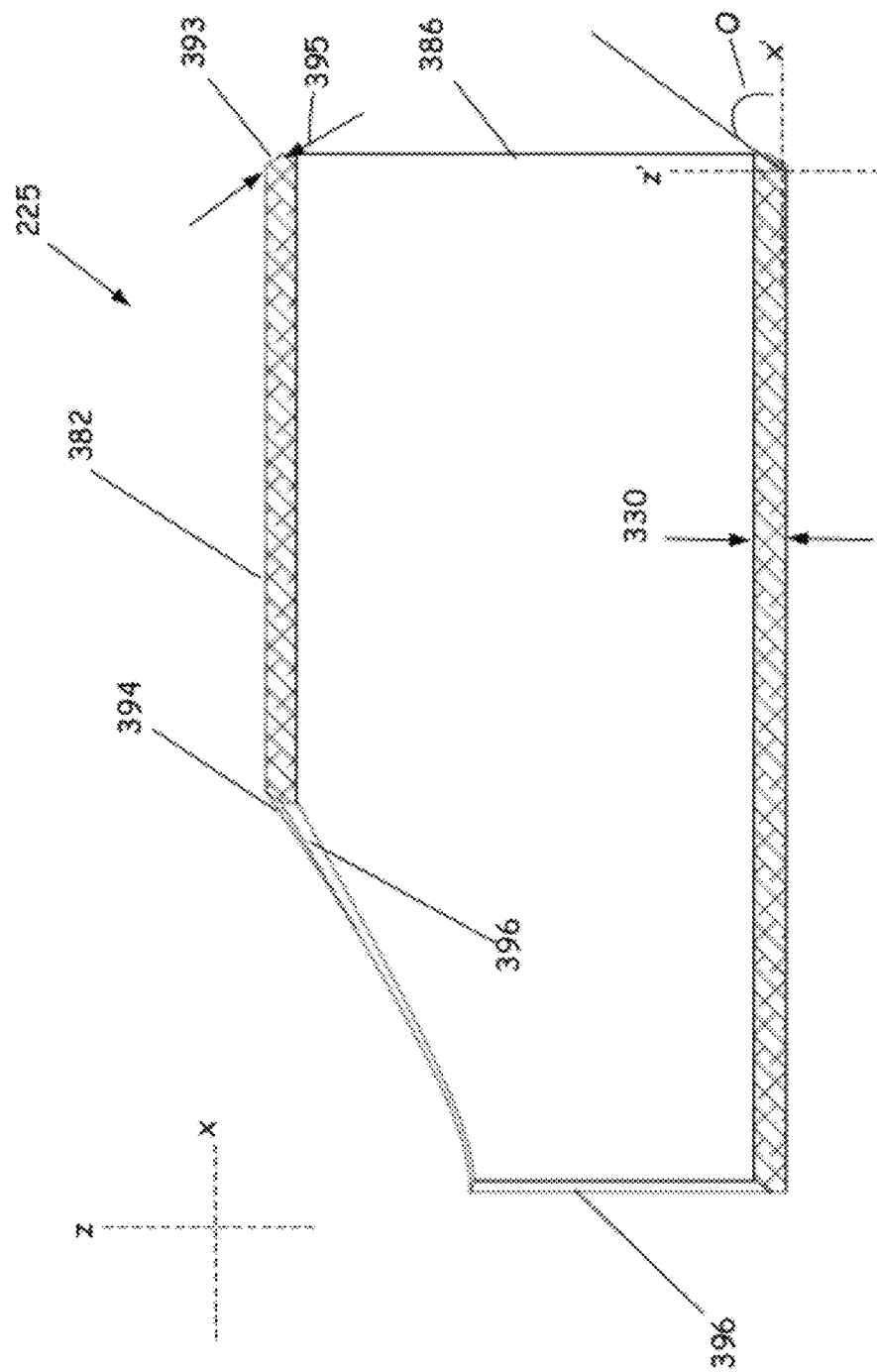
FIG. 14 is a cross-sectional view of the end fitting of FIG. 11.

The shape of the end fitting 225 as projected in an x-z plane of the x-y-z coordinate axis is shown in FIG. 14. In the example embodiment, an opening surface 393 adjacent to the second proximal opening 386 is beveled at an angle O around an entire circumference of second external surface 382, as measured with respect to a x'-z' coordinate axis. As referred to above, opening surface 393 is beveled at angle O such that a V-shaped groove is formed when end fitting 225 and central pipe section 210 are positioned together, as shown in FIG. 2. In the described embodiment, the beveled surface (not shown) of a respective end 215 (or 220) of central pipe section 210 and the beveled opening surface 393 form an acute angle when positioned together as described. Further, the opening surface 393 has a width 395.

Figure 15:
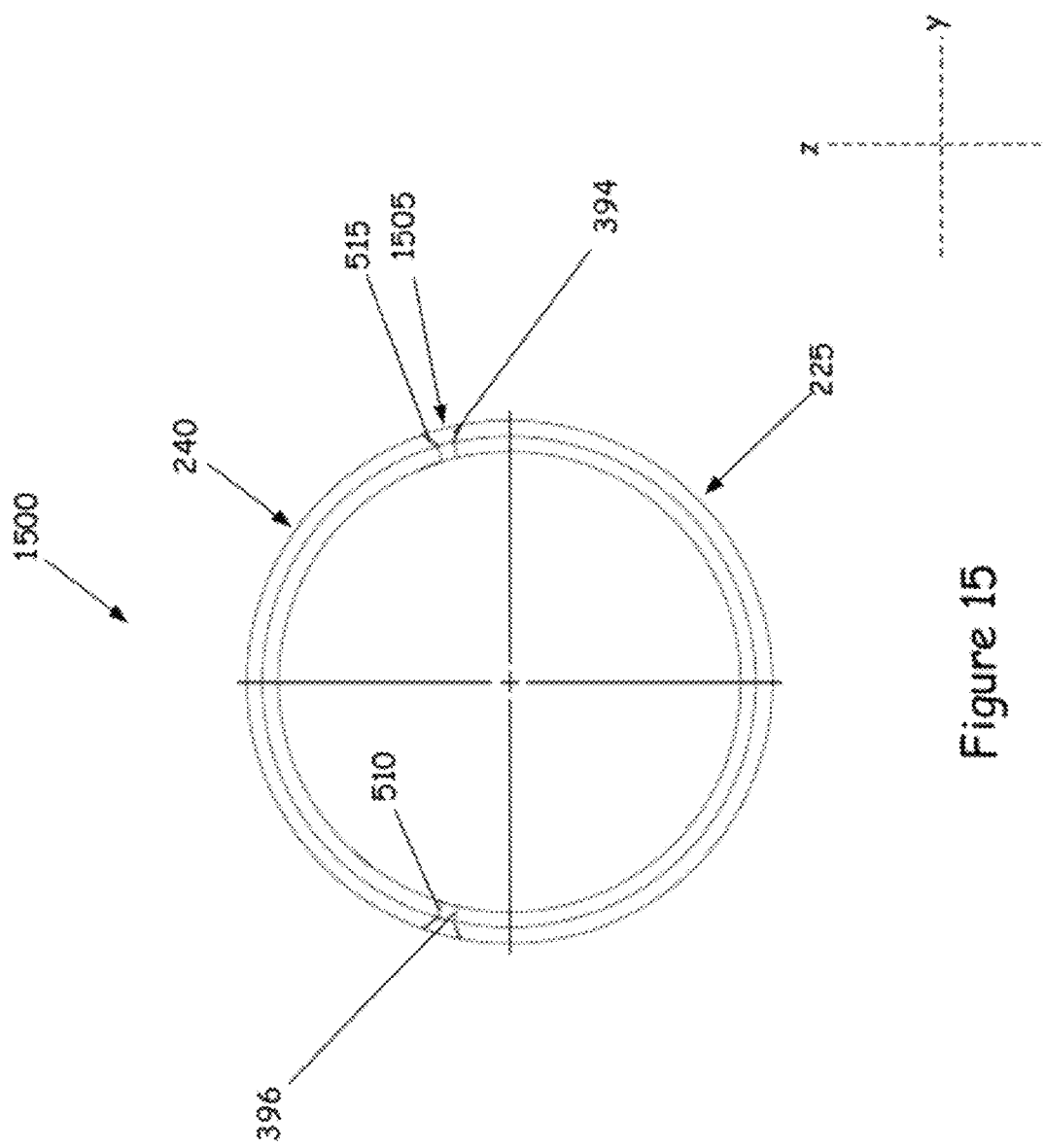
FIG. 15 is an end view of a window section positioned in close proximity to an end fitting.

Referring now to FIG. 15, an end view 1500 of a window section 240 positioned in close proximity to end fitting 225 is shown. More specifically, end view 1500 demonstrates the orientation of respective facets 394, 396 of the end fitting 225 and the respective facets 510, 515 of the window section 240 when window section 240 is positioned in close proximity to end fitting 225. In the described embodiment, upon positioning the window section 240 to the end fitting 225, the second window facet 394 coincidentally engages with first facet 510. Additionally, first window facet 396 of end fitting 225 and second facet 515 form a V-shaped groove 1505. In the described embodiment, the V-shaped groove 1505 is formed along the entire interface between the end fitting 225 and the window section 240.

Further, as depicted in FIGS. 2 and 4, upon positioning the remaining portion 162 with the other respective apparatus pieces 225, and 240 of the replacement section 205, the primary facet 370 of remaining portion 162 coincidentally engages with first facet 510 of window section 240 and the first window facet 396 of end fitting 225. Additionally, secondary facet 375 of remaining portion 162 and second facet 515 of window section 240 form a V-shaped groove such that V-shaped groove 1505 is formed along the entire interface between the end fitting 225, the window section 240 and the remaining portion 162.

Figure 16:
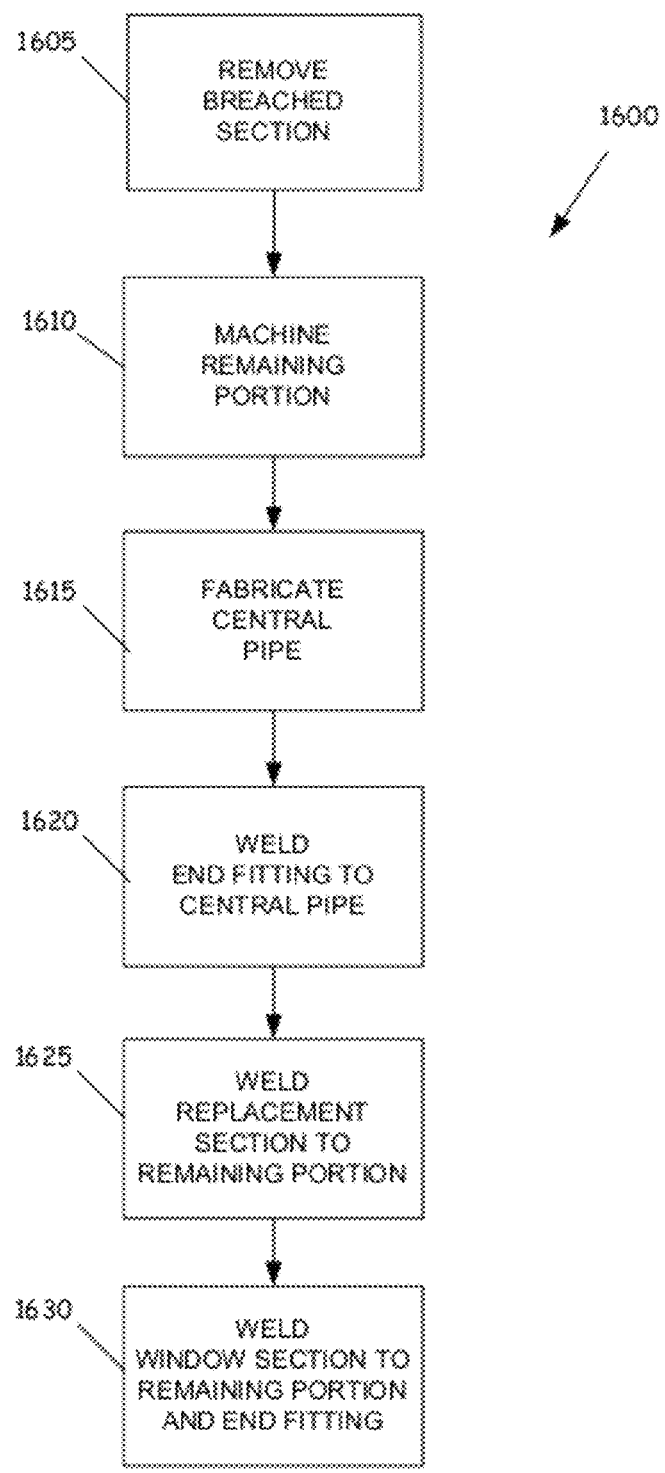
FIG. 16 is an example method for replacing a breached pipe section.

Referring now to FIG. 16, an example method 1600 for replacing a breached section of pipe in a network of pipework is described. Initially, at operation 1605, a breached section of pipe is removed via is removed grinding, sawing, flame cutting, plasma cutting, or other method as described above. In certain embodiments, a length of removed pipe is the length of the breach plus twice the outer diameter of the pipe.

Next, at operation 1610, the remaining portions of the breached pipe are machined to include a primary facet, and a secondary facet. Next, at operation 1615, a length of central pipe section is fabricated. In the example embodiment, the ends of the central pipe section are beveled. Next, at operation 1620, a pre-fabricated end fitting is welded to each end of central pipe section of pipe via an external circumferential weld to form a replacement pipe section. At operation 1625, the replacement pipe section is positioned such that end fitting is welded to remaining portions of the breached pipe. Welding is performed through window aperture such that an internal partial-circumferential weld is formed. Finally, at operation 1630, a pre-fabricated window section is positioned to the window aperture and welded to end fitting and remaining portion.

Figure 17:
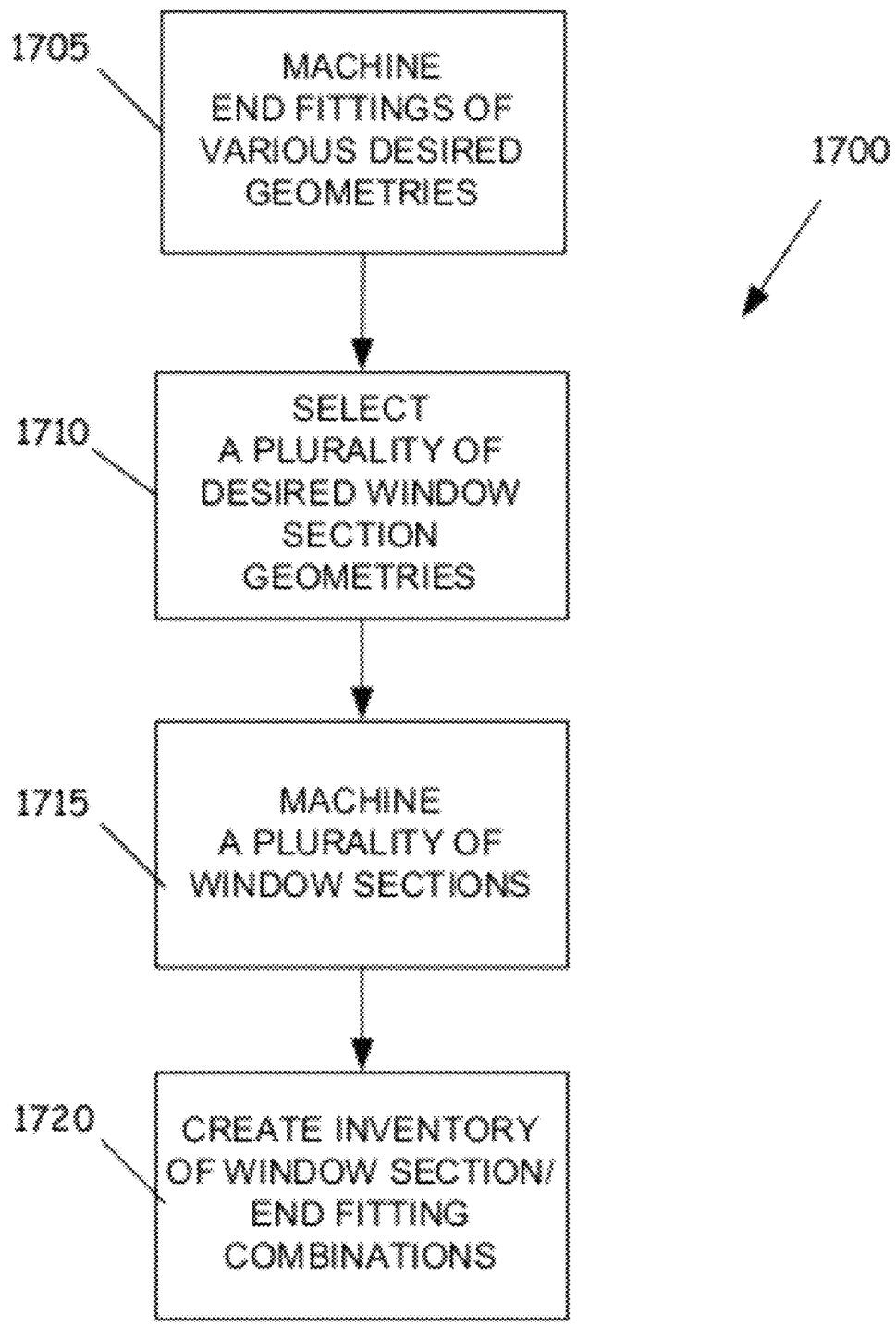
FIG. 17 is an example method of manufacture of a kit including a window section and an end fitting of a replacement pipe section.

Referring now to FIG. 17, an example method 1700 for creating a kit including a pre-machined end fitting and a pre-machined window section of the replacement section is shown. Initially, at operation 1705, a plurality of end fittings having a range of desired cross-sectional geometries and/or lengths are machined. In one example, a plurality of cylindrical end fittings is machined, wherein the end fittings have an inner diameter over a range of desirable inner diameters.

Next, at operation 1710, a plurality of preferred window aperture geometries are selected for each of the plurality of machined end fittings. In the example embodiments described above, the range of desirable inner diameters and the range of window aperture geometries are chosen based on the configuration of the network of pipework. In this manner, an expedient breached pipe replacement procedure is facilitated. Next, at operation 1715, the corresponding window sections are machined. According to principles of the present disclosure, the corresponding window sections have geometries based on the selected inner diameter and window aperture geometry of each of the respective machined pipe fittings. Finally, at operation 1720, an inventory of end fitting and corresponding window section combinations are created to provide a stockpile of each respective design. In this manner, differently sized and shaped end fittings and window sections are availability in an inventory for ready access as needed when a pipe is breached.

The preceding embodiments are intended to illustrate without limitation the utility and scope of the present disclosure. Those skilled in the art will readily recognize various modifications and changes that may be made to the embodiments described above without departing from the true spirit and scope of the disclosure.

What is claimed is:

1. An apparatus for replacing a breached section of pipe, the apparatus comprising:
   a first pipe fitting having a first end, a second end, and a first surface defining a first aperture at the second end of the first pipe fitting;
   a middle pipe member;
   a second pipe fitting having a first end, a second end, and a second surface defining a second aperture at the second end of the second pipe fitting; and
   first and second aperture caps;
   wherein the first end of each of the first and second pipe fittings is welded to opposite ends of the middle pipe member, and the second end of each of the first and second pipe fittings is welded through the respective first and second apertures to opposite ends of pipe surrounding the breached pipe section; and
   wherein the first and second aperture caps are welded to respective ones of the first and second apertures of the first and second pipe fittings to close the respective first and second apertures.

2. The apparatus of claim 1, wherein the opposite ends of the middle pipe member each include a first circumferential beveled surface, and the first end of each of the first and second pipe fittings include a second circumferential beveled surface.

3. The apparatus of claim 2, wherein the second end of each of the first and second pipe fittings includes a second window facet that is adjacent to an external surface and a first window facet that is adjacent to an internal surface and the second window facet.

4. The apparatus of claim 3, wherein a groove is formed between the first circumferential beveled surface and the second circumferential beveled surface when the first and second pipe fittings are positioned to weld the respective pipe fittings to the opposite ends of the middle pipe member.

5. The apparatus of claim 4, wherein a groove is formed between a primary facet of opposite ends of the breached section of pipe and the second window facet of each of the first and second pipe fittings.

6. The apparatus of claim 1, wherein the second end of each of the first and second pipe fittings includes a second window facet that is adjacent to an external surface and a first window facet that is adjacent to an internal surface and the second window facet.

7. The apparatus of claim 1, wherein each of the first and second aperture caps are formed to include a first facet adjacent to a bottom surface and a second facet adjacent to a top surface and the first facet surface, wherein the first and second facets define a first edge periphery, a second edge periphery, and a third edge periphery.

8. The apparatus of claim 7, wherein each of the first, second, and third edge peripheries are defined by a polynomial, and wherein the first and second aperture caps are formed by varying one or more coefficients of the polynomial.

9. The apparatus of claim 7, wherein, upon positioning the first and second aperture caps to weld the first and second aperture caps to the first and second apertures of the first and second pipe fittings to close the respective first and second apertures, a groove is formed between the second facet of the aperture caps and a window facet of each of the first and second pipe fittings.

10. The apparatus of claim 1, wherein one or more of following are pre-machined: the first pipe fitting; the middle pipe member; the second pipe fitting; and the first and second aperture caps.

11. The apparatus of claim 1, wherein the first pipe fitting, the middle pipe member, and the second cylindrical pipe fitting are formed as an integral pipe section.

\* \* \* \* \*